(12) United States Patent
Groeke et al.

(10) Patent No.: US 7,621,092 B2
(45) Date of Patent: Nov. 24, 2009

(54) DEVICE AND METHOD FOR LOCKING TWO BUILDING BOARDS

(75) Inventors: Carsten Groeke, Berlin (DE); Wolfgang Gollatz, Wittstock (DE)

(73) Assignee: Flooring Technologies Ltd., Pieta (MT)

( * ) Notice: Subject to any disclaimer, the term of this patent is extended or adjusted under 35 U.S.C. 154(b) by 302 days.

(21) Appl. No.: 11/673,035

(22) Filed: Feb. 9, 2007

(65) Prior Publication Data

US 2007/0193178 A1    Aug. 23, 2007

(30) Foreign Application Priority Data

Feb. 10, 2006   (DE) .................. 10 2006 006 124

(51) Int. Cl.
    *E04B 2/00*    (2006.01)
(52) U.S. Cl. .................. 52/586.1; 52/582.1; 52/582.2; 52/591.5
(58) Field of Classification Search .............. 52/582.1, 52/390, 392, 533, 534, 539, 553, 578, 586.1, 52/586.2, 588.1, 589.1, 590.2, 590.3, 591.1, 52/591.2, 591.3, 571.4, 591.5, 592.1, 2, 4
    See application file for complete search history.

(56) References Cited

U.S. PATENT DOCUMENTS

| 213,740 | A | 4/1879 | Conner |
|---|---|---|---|
| 623,562 | A | 4/1899 | Rider |
| 714,987 | A | 12/1902 | Wolfe |
| 753,791 | A | 3/1904 | Fulghum |
| 1,124,228 | A | 1/1915 | Houston |
| 1,407,679 | A | 2/1922 | Ruthrauff |
| 1,454,250 | A | 5/1923 | Parsons |
| 1,468,288 | A | 9/1923 | Een |
| 1,477,813 | A | 12/1923 | Daniels |
| 1,510,924 | A | 10/1924 | Daniels et al. |
| 1,540,128 | A | 6/1925 | Houston |
| 1,575,821 | A | 3/1926 | Daniels |
| 1,602,256 | A | 10/1926 | Sellin |
| 1,602,267 | A | 10/1926 | Karwisch |
| 1,615,096 | A | 1/1927 | Meyers |

(Continued)

FOREIGN PATENT DOCUMENTS

AT            005566        8/2002

(Continued)

OTHER PUBLICATIONS

Opposition II EPO. 698. 162—Facts—Arguments Evidence (11 pages)—translation, Jun. 1999.

(Continued)

*Primary Examiner*—Richard E Chilcot, Jr.
*Assistant Examiner*—Mark R Wendell
(74) *Attorney, Agent, or Firm*—Greenblum & Bernstein PLC

(57) ABSTRACT

A device for locking two building boards comprises a tongue element inserted into a groove a first building board. The tongue element comprises a spring having a plurality of wave arches. A groove is provided in a core of a second building board and corresponds to the groove of the first building board, such that when the groove of the first and second building boards overlap during a connection of the first and second building boards, by a vertical lowering movement, the first and second building boards are locked in a direction parallel to the visible side by the tongue element.

31 Claims, 7 Drawing Sheets

U.S. PATENT DOCUMENTS

| | | |
|---|---|---|
| 1,622,103 A | 3/1927 | Fulton |
| 1,622,104 A | 3/1927 | Fulton |
| 1,637,634 A | 8/1927 | Carter |
| 1,644,710 A | 10/1927 | Crooks |
| 1,660,480 A | 2/1928 | Daniels |
| 1,714,738 A | 5/1929 | Smith |
| 1,718,702 A | 6/1929 | Pfiester |
| 1,734,826 A | 11/1929 | Pick |
| 1,764,331 A | 6/1930 | Moratz |
| 1,776,188 A | 9/1930 | Langb'aum |
| 1,778,069 A | 10/1930 | Fetz |
| 1,779,729 A | 10/1930 | Bruce |
| 1,787,027 A | 12/1930 | Wasleff |
| 1,823,039 A | 9/1931 | Gruner |
| 1,859,667 A | 5/1932 | Gruner |
| 1,898,364 A | 2/1933 | Gynn |
| 1,902,716 A | 3/1933 | Newton |
| 1,906,411 A | 5/1933 | Potvin |
| 1,921,164 A | 8/1933 | Lewis |
| 1,929,871 A | 10/1933 | Jones |
| 1,940,377 A | 12/1933 | Storm |
| 1,946,648 A | 2/1934 | Taylor |
| 1,953,306 A | 4/1934 | Moratz |
| 1,986,739 A | 1/1935 | Mitte |
| 1,988,201 A | 1/1935 | Hall |
| 2,004,193 A | 6/1935 | Cherry |
| 2,023,066 A | 12/1935 | Curtis et al. |
| 2,044,216 A | 6/1936 | Klages |
| 2,065,525 A | 12/1936 | Hamilton |
| 2,123,409 A | 7/1938 | Elmendorf |
| 2,220,606 A | 11/1940 | Malarkey et al. |
| 2,276,071 A | 3/1942 | Scull |
| 2,280,071 A | 4/1942 | Hamilton |
| 2,324,628 A | 7/1943 | Kähr |
| 2,328,051 A | 8/1943 | Bull |
| 2,398,632 A | 4/1946 | Frost et al. |
| 2,430,200 A | 11/1947 | Wilson |
| 2,740,167 A * | 4/1956 | Rowley .................... 52/591.1 |
| 2,894,292 A | 7/1959 | Gramelspacker |
| 3,045,294 A | 7/1962 | Livezey, Jr. |
| 3,100,556 A | 8/1963 | De Ridder |
| 3,125,138 A | 3/1964 | Bolenbach |
| 3,182,769 A | 5/1965 | De Ridder |
| 3,203,149 A | 8/1965 | Soddy |
| 3,204,380 A | 9/1965 | Smith et al. |
| 3,267,630 A | 8/1966 | Omholt |
| 3,282,010 A | 11/1966 | King, Jr. |
| 3,310,919 A | 3/1967 | Bue et al. |
| 3,347,048 A | 10/1967 | Brown et al. |
| 3,460,304 A | 8/1969 | Braeuninger et al. |
| 3,479,784 A | 11/1969 | Massagli |
| 3,481,810 A | 12/1969 | Waite |
| 3,526,420 A | 9/1970 | Brancaleone |
| 3,538,665 A | 11/1970 | Gohner |
| 3,553,919 A | 1/1971 | Omholt |
| 3,555,762 A | 1/1971 | Costanzo, Jr. |
| 3,608,258 A | 9/1971 | Spratt |
| 3,694,983 A | 10/1972 | Couquet |
| 3,714,747 A | 2/1973 | Curran |
| 3,720,027 A | 3/1973 | Christensen |
| 3,731,445 A | 5/1973 | Hoffmann et al. |
| 3,759,007 A | 9/1973 | Thiele |
| 3,760,548 A | 9/1973 | Sauer et al. |
| 3,768,846 A | 10/1973 | Hensley et al. |
| 3,798,111 A | 3/1974 | Lane et al. |
| 3,807,113 A | 4/1974 | Turner |
| 3,859,000 A | 1/1975 | Webster |
| 3,878,030 A | 4/1975 | Cook |
| 3,902,293 A | 9/1975 | Witt et al. |
| 3,908,053 A | 9/1975 | Hettich |
| 3,921,312 A | 11/1975 | Fuller |
| 3,936,551 A | 2/1976 | Elmendorf et al. |
| 3,988,187 A | 10/1976 | Witt et al. |
| 4,006,048 A | 2/1977 | Cannady, Jr. et al. |
| 4,090,338 A | 5/1978 | Bourgade |
| 4,091,136 A | 5/1978 | O'Brian et al. |
| 4,099,358 A | 7/1978 | Compaan |
| 4,118,533 A | 10/1978 | Hipchen et al. |
| 4,131,705 A | 12/1978 | Kubinsky |
| 4,164,832 A | 8/1979 | Van Zandt |
| 4,169,688 A | 10/1979 | Toshio |
| 4,242,390 A | 12/1980 | Nemeth |
| 4,243,716 A | 1/1981 | Kosaka et al. |
| 4,245,689 A | 1/1981 | Grard et al. |
| 4,246,310 A | 1/1981 | Hunt et al. |
| 4,290,248 A | 9/1981 | Kemerer et al. |
| 4,299,070 A | 11/1981 | Oltmanns et al. |
| 4,426,820 A | 1/1984 | Terbrack et al. |
| 4,431,044 A | 2/1984 | Bruneau |
| 4,449,346 A | 5/1984 | Tremblay |
| 4,471,012 A | 9/1984 | Maxwell |
| 4,501,102 A | 2/1985 | Knowles |
| 4,561,233 A | 12/1985 | Harter et al. |
| 4,585,685 A | 4/1986 | Forry et al. |
| 4,612,745 A | 9/1986 | Hovde |
| 4,641,469 A | 2/1987 | Wood |
| 4,653,242 A | 3/1987 | Ezard |
| 4,654,244 A | 3/1987 | Eckert et al. |
| 4,703,597 A | 11/1987 | Eggemar |
| 4,715,162 A | 12/1987 | Brightwell |
| 4,738,071 A | 4/1988 | Ezard |
| 4,752,497 A | 6/1988 | McConkey et al. |
| 4,769,963 A | 9/1988 | Meyerson |
| 4,819,932 A | 4/1989 | Trotter, Jr. |
| 4,831,806 A | 5/1989 | Niese et al. |
| 4,845,907 A | 7/1989 | Meek |
| 4,905,442 A | 3/1990 | Daniels |
| 4,940,503 A | 7/1990 | Lindgren et al. |
| 4,947,602 A | 8/1990 | Pollasky |
| 5,029,425 A | 7/1991 | Bogataj |
| 5,092,095 A | 3/1992 | Zadok et al. |
| 5,103,614 A | 4/1992 | Kawaguchi et al. |
| 5,113,632 A | 5/1992 | Hanson |
| 5,117,603 A | 6/1992 | Weintraub |
| 5,136,823 A | 8/1992 | Pellegrino |
| 5,148,850 A | 9/1992 | Urbanick |
| 5,165,816 A | 11/1992 | Parasin |
| 5,179,812 A | 1/1993 | Itill |
| 5,205,091 A | 4/1993 | Brown |
| 5,216,861 A | 6/1993 | Meyerson |
| 5,251,996 A | 10/1993 | Hiller et al. |
| 5,253,464 A | 10/1993 | Nilsen |
| 5,283,102 A | 2/1994 | Sweet et al. |
| 5,295,341 A | 3/1994 | Kajiwara |
| 5,325,649 A | 7/1994 | Kajiwara |
| 5,335,473 A | 8/1994 | Chase |
| 5,344,700 A | 9/1994 | McGrath et al. |
| 5,348,778 A | 9/1994 | Knipp et al. |
| 5,349,796 A | 9/1994 | Meyerson |
| 5,390,457 A | 2/1995 | Sjölander |
| 5,413,834 A | 5/1995 | Hunter et al. |
| 5,433,806 A | 7/1995 | Pasquali et al. |
| 5,474,831 A | 12/1995 | Nystrom |
| 5,497,589 A | 3/1996 | Porter |
| 5,502,939 A | 4/1996 | Zadok et al. |
| 5,540,025 A | 7/1996 | Takehara et al. |
| 5,567,497 A | 10/1996 | Zegler et al. |
| 5,570,554 A | 11/1996 | Searer |
| 5,597,024 A | 1/1997 | Bolyard et al. |
| 5,618,602 A * | 4/1997 | Nelson ....................... 428/60 |
| 5,630,304 A | 5/1997 | Austin |
| 5,653,099 A | 8/1997 | MacKenzie |
| 5,671,575 A | 9/1997 | Wu |
| 5,694,734 A | 12/1997 | Cercone et al. |

| | | | | | | |
|---|---|---|---|---|---|---|
| 5,706,621 | A | 1/1998 | Pervan | 6,553,724 B1 | 4/2003 | Bigler |
| 5,736,227 | A | 4/1998 | Sweet et al. | 6,558,754 B1 | 5/2003 | Velin et al. |
| 5,768,850 | A | 6/1998 | Chen | 6,565,919 B1 | 5/2003 | Hansson et al. |
| 5,797,175 | A | 8/1998 | Schneider | 6,569,272 B2 | 5/2003 | Tychsen |
| 5,797,237 | A | 8/1998 | Finkell, Jr. | 6,588,166 B2 | 7/2003 | Martensson |
| 5,823,240 | A | 10/1998 | Bolyard et al. | 6,591,568 B1 | 7/2003 | Pålsson |
| 5,827,592 | A | 10/1998 | Van Gulik et al. | 6,601,359 B2 | 8/2003 | Olofsson |
| 5,860,267 | A | 1/1999 | Pervan | 6,606,834 B2 | 8/2003 | Martensson et al. |
| 5,899,038 | A * | 5/1999 | Stroppiana ................. 52/403.1 | 6,617,009 B1 | 9/2003 | Chen et al. |
| 5,907,934 | A | 6/1999 | Austin | 6,635,174 B1 | 10/2003 | Berg et al. |
| 5,935,668 | A | 8/1999 | Smith | 6,641,629 B2 | 11/2003 | Safta et al. |
| 5,943,239 | A | 8/1999 | Shamblin et al. | 6,646,088 B2 | 11/2003 | Fan et al. |
| 5,953,878 | A | 9/1999 | Johnson | 6,647,689 B2 * | 11/2003 | Pletzer et al. ............... 52/592.1 |
| 5,968,625 | A | 10/1999 | Hudson | 6,647,690 B1 | 11/2003 | Martensson |
| 5,985,397 | A | 11/1999 | Witt et al. | 6,649,687 B1 | 11/2003 | Gheewala et al. |
| 5,987,839 | A | 11/1999 | Hamar et al. | 6,659,097 B1 | 12/2003 | Houston |
| 6,006,486 | A * | 12/1999 | Moriau et al. ............... 52/589.1 | 6,672,030 B2 | 1/2004 | Schulte |
| 6,023,907 | A | 2/2000 | Pervan | 6,675,544 B1 * | 1/2004 | Ou et al. ....................... 52/539 |
| 6,065,262 | A | 5/2000 | Motta | 6,681,820 B2 | 1/2004 | Olofsson |
| 6,094,882 | A | 8/2000 | Pervan | 6,682,254 B1 | 1/2004 | Olofsson et al. |
| 6,101,778 | A | 8/2000 | Martensson | 6,775,545 B2 | 1/2004 | Chen et al. |
| 6,119,423 | A | 9/2000 | Costantino | 6,685,993 B1 | 2/2004 | Hansson et al. |
| 6,134,854 | A | 10/2000 | Stanchfield | 6,711,864 B2 | 3/2004 | Erwin |
| 6,148,884 | A | 11/2000 | Bolyard et al. | 6,711,869 B2 | 3/2004 | Tychsen |
| 6,168,866 | B1 | 1/2001 | Clark | 6,715,253 B2 | 4/2004 | Pervan |
| 6,182,410 | B1 | 2/2001 | Pervan | 6,722,809 B2 * | 4/2004 | Hamberger et al. ......... 403/329 |
| 6,186,703 | B1 | 2/2001 | Shaw | 6,723,438 B2 | 4/2004 | Chang et al. |
| 6,205,639 | B1 | 3/2001 | Pervan | 6,729,091 B1 | 5/2004 | Martensson |
| 6,209,278 | B1 | 4/2001 | Tychsen | 6,745,534 B2 | 6/2004 | Kornfalt |
| 6,216,403 | B1 | 4/2001 | Belbeoc'h | 6,761,008 B2 | 7/2004 | Chen et al. |
| 6,216,409 | B1 | 4/2001 | Roy et al. | 6,761,794 B2 | 7/2004 | Mott et al. |
| D442,296 | S | 5/2001 | Külik | 6,763,643 B1 | 7/2004 | Martensson |
| D442,297 | S | 5/2001 | Külik | 6,766,622 B1 | 7/2004 | Thiers |
| D442,298 | S | 5/2001 | Külik | 6,769,217 B2 | 8/2004 | Nelson |
| D442,706 | S | 5/2001 | Külik | 6,769,218 B2 | 8/2004 | Pervan |
| D442,707 | S | 5/2001 | Külik | 6,772,568 B2 | 8/2004 | Thiers et al. |
| 6,224,698 | B1 | 5/2001 | Endo | 6,786,019 B2 | 9/2004 | Thiers |
| 6,238,798 | B1 | 5/2001 | Kang et al. | 6,803,109 B2 | 10/2004 | Qiu et al. |
| 6,247,285 | B1 | 6/2001 | Moebus | 6,805,951 B2 | 10/2004 | Kornfält et al. |
| 6,769,835 | B2 | 8/2001 | Stridsman | 6,823,638 B2 | 11/2004 | Stanchfield |
| D449,119 | S | 10/2001 | Külik | 6,841,023 B2 | 1/2005 | Mott |
| D449,391 | S | 10/2001 | Külik | 6,854,235 B2 * | 2/2005 | Martensson .................. 52/601 |
| D449,392 | S | 10/2001 | Külik | 6,968,659 B2 * | 11/2005 | Boyer ........................ 52/302.4 |
| 6,314,701 | B1 | 11/2001 | Meyerson | 7,451,578 B2 * | 11/2008 | Hanning .................... 52/586.1 |
| 6,324,803 | B1 | 12/2001 | Pervan | 7,454,875 B2 * | 11/2008 | Pervan et al. ............... 52/586.2 |
| 6,345,481 | B1 | 2/2002 | Nelson | 2001/0029720 A1 | 10/2001 | Pervan |
| 6,363,677 | B1 | 4/2002 | Chen et al. | 2001/0034992 A1 | 11/2001 | Pletzer et al. |
| 6,397,547 | B1 | 6/2002 | Martensson | 2002/0007608 A1 | 1/2002 | Pervan |
| 6,418,683 | B1 | 7/2002 | Martensson et al. | 2002/0007609 A1 | 1/2002 | Pervan |
| 6,421,970 | B1 | 7/2002 | Matensson et al. | 2002/0014047 A1 | 2/2002 | Thiers |
| 6,427,408 | B1 | 8/2002 | Krieger | 2002/0020127 A1 | 2/2002 | Thiers et al. |
| 6,436,159 | B1 | 8/2002 | Safta et al. | 2002/0046528 A1 | 4/2002 | Pervan et al. |
| 6,438,919 | B1 | 8/2002 | Knauseder | 2002/0056245 A1 | 5/2002 | Thiers |
| 6,446,405 | B1 | 9/2002 | Pervan | 2002/0106439 A1 | 8/2002 | Cappelle |
| 6,449,913 | B1 | 9/2002 | Shelton | 2002/0106680 A1 | 10/2002 | Laurence et al. |
| 6,449,918 | B1 | 9/2002 | Nelson | 2002/0152707 A1 | 10/2002 | Martensson |
| 6,453,632 | B1 | 9/2002 | Huang | 2003/0024199 A1 * | 2/2003 | Pervan et al. ............... 52/589.1 |
| 6,458,232 | B1 | 10/2002 | Valentinsson | 2003/0024200 A1 | 2/2003 | Moriau et al. |
| 6,460,306 | B1 | 10/2002 | Nelson | 2003/0024201 A1 | 2/2003 | Moriau et al. |
| 6,461,636 | B1 | 10/2002 | Arth et al. | 2003/0029115 A1 | 2/2003 | Moriau et al. |
| 6,465,046 | B1 | 10/2002 | Hansson et al. | 2003/0029116 A1 | 2/2003 | Moriau et al. |
| 6,490,836 | B1 | 12/2002 | Moriau et al. | 2003/0029117 A1 | 2/2003 | Moriau et al. |
| 6,497,961 | B2 | 12/2002 | Kang et al. | 2003/0033777 A1 | 2/2003 | Thiers et al. |
| 6,505,452 | B1 * | 1/2003 | Hannig et al. ............... 52/582.1 | 2003/0033784 A1 | 2/2003 | Pervan |
| 6,510,665 | B2 | 1/2003 | Pervan | 2003/0094230 A1 | 5/2003 | Sjoberg |
| 6,516,579 | B1 | 2/2003 | Pervan | 2003/0115812 A1 | 6/2003 | Pervan |
| 6,517,935 | B1 | 2/2003 | Kornfalt et al. | 2003/0115821 A1 | 6/2003 | Pervan |
| 6,519,912 | B1 | 2/2003 | Eckmann et al. | 2003/0159385 A1 | 8/2003 | Thiers |
| 6,521,314 | B2 | 2/2003 | Tychsen | 2003/0167717 A1 | 9/2003 | Garcia |
| 6,532,709 | B2 | 3/2003 | Pervan | 2003/0196397 A1 * | 10/2003 | Niese et al. ................... 52/392 |
| 6,533,855 | B1 | 3/2003 | Gaynor et al. | 2003/0196405 A1 | 10/2003 | Pervan |
| 6,536,178 | B1 | 3/2003 | Pålsson et al. | 2003/0205013 A1 | 11/2003 | Garcia |
| 6,546,691 | B2 | 4/2003 | Peopolder | 2003/0233809 A1 | 12/2003 | Pervan |

| | | | | | | |
|---|---|---|---|---|---|---|
| 2004/0016196 | A1 | 1/2004 | Pervan | DE | 4002547 | 8/1991 |
| 2004/0035078 | A1 | 2/2004 | Pervan | DE | 4134452 | 4/1993 |
| 2004/0092006 | A1 | 5/2004 | Lindekens et al. | DE | 4215273 | 11/1993 |
| 2004/0105994 | A1 | 6/2004 | Lu et al. | DE | 4242530 | 6/1994 |
| 2004/0139678 | A1 | 7/2004 | Pervan | DE | 4011656 | 1/1995 |
| 2004/0159066 | A1 | 8/2004 | Thiers et al. | DE | 4324137 | 1/1995 |
| 2004/0177584 | A1 | 9/2004 | Pervan | DE | 4107151 | 2/1995 |
| 2004/0200165 | A1 | 10/2004 | Garcia et al. | DE | 29 517128 | 2/1996 |
| 2004/0206036 | A1 | 10/2004 | Pervan | DE | 4242530 | 9/1996 |
| 2004/0211143 | A1* | 10/2004 | Hanning ............... 52/578 | DE | 3544845 | 12/1996 |
| 2004/0237447 | A1 | 12/2004 | Thiers et al. | DE | 29 710175 | 9/1997 |
| 2004/0237448 | A1 | 12/2004 | Thiers et al. | DE | 19 616510 | 3/1998 |
| 2004/0241374 | A1 | 12/2004 | Thiers et al. | DE | 19 651149 | 6/1998 |
| 2004/0244322 | A1 | 12/2004 | Thiers et al. | DE | 19 709641 | 9/1998 |
| 2004/0250493 | A1 | 12/2004 | Thiers et al. | DE | 19 718319 | 11/1998 |
| 2004/0255541 | A1 | 12/2004 | Thiers et al. | DE | 19 735189 | 6/2000 |
| 2004/0258907 | A1 | 12/2004 | Kornfalt et al. | DE | 20 001225 | 8/2000 |
| 2005/0003149 | A1 | 1/2005 | Kornfalt et al. | DE | 19 925248 | 12/2000 |
| 2005/0016099 | A1 | 1/2005 | Thiers | DE | 20 017461 | 3/2001 |
| 2006/0236642 | A1* | 10/2006 | Pervan ............... 52/578 | DE | 20 018284 | 3/2001 |
| 2007/0006543 | A1* | 1/2007 | Engstrom ............... 52/582.1 | DE | 20 206460 | 8/2002 |
| 2007/0028547 | A1* | 2/2007 | Grafenauer et al. ...... 52/582.1 | DE | 20 218331 | 5/2004 |
| 2008/0066415 | A1* | 3/2008 | Pervan et al. ............... 52/588.1 | DE | 10 2005 002297 | 8/2005 |
| 2008/0110125 | A1* | 5/2008 | Pervan ............... 52/582.2 | EP | 0 248127 | 12/1987 |
| | | | | EP | 0248127 | 12/1987 |
| | FOREIGN PATENT DOCUMENTS | | | EP | 0623724 | 11/1994 |
| AU | 713628 | 5/1998 | | EP | 0652340 | 5/1995 |
| AU | 20 0020703 | 1/2000 | | EP | 0667936 | 8/1995 |
| BE | 417526 | 9/1936 | | EP | 0690185 | 1/1996 |
| BE | 557844 | 6/1957 | | EP | 0849416 | 6/1998 |
| BE | 557844 | 3/1960 | | EP | 0698162 | 9/1998 |
| BE | 09 600527 | 6/1998 | | EP | 0903451 | 3/1999 |
| BE | 09 700344 | 10/1998 | | EP | 0855482 | 12/1999 |
| BE | 1010487 | 12/1999 | | EP | 0877130 | 1/2000 |
| CA | 991373 | 6/1976 | | EP | 0969163 | 1/2000 |
| CA | 2226286 | 12/1997 | | EP | 0969164 | 1/2000 |
| CA | 2252791 | 5/1999 | | EP | 0974713 | 1/2000 |
| CA | 2 289309 | 7/2000 | | EP | 0843763 | 10/2000 |
| CH | 200949 | 1/1939 | | EP | 1200690 | 5/2002 |
| CH | 211877 | 1/1941 | | EP | 0958441 | 7/2003 |
| CH | 562377 | 5/1975 | | EP | 1026341 | 8/2003 |
| DE | 314207 | 9/1919 | | ES | 163421 | 9/1968 |
| DE | 531989 | 8/1931 | | ES | 460194 | 5/1978 |
| DE | 740235 | 10/1943 | | ES | 283331 | 5/1985 |
| DE | 812959 | 9/1951 | | ES | 1019585 | 12/1991 |
| DE | 1089966 | 9/1960 | | ES | 1019585 | 1/1992 |
| DE | 1534278 | 2/1966 | | ES | 2168045 | 5/2002 |
| DE | 1212225 | 3/1966 | | FI | 843060 | 8/1984 |
| DE | 1212275 | 3/1966 | | FR | 1293043 | 4/1962 |
| DE | 1534802 | 4/1970 | | FR | 2691491 | 11/1983 |
| DE | 7 102476 | 6/1971 | | FR | 2568295 | 5/1986 |
| DE | 7102476 | 6/1971 | | FR | 2623544 | 5/1989 |
| DE | 2007129 | 9/1971 | | FR | 2630149 | 10/1989 |
| DE | 1534278 | 11/1971 | | FR | 2637932 | 4/1990 |
| DE | 2 252643 | 10/1972 | | FR | 2675174 | 10/1991 |
| DE | 2159042 | 6/1973 | | FR | 2667639 | 4/1992 |
| DE | 2238660 | 2/1974 | | FR | 2691491 | 11/1993 |
| DE | 7402354 | 5/1974 | | FR | 2697275 | 4/1994 |
| DE | 2502992 | 7/1976 | | FR | 2712329 | 5/1995 |
| DE | 2616077 | 10/1977 | | FR | 2776956 | 10/1999 |
| DE | 2917025 | 11/1980 | | FR | 2781513 | 1/2000 |
| DE | 7911924 | 3/1981 | | FR | 2785633 | 5/2000 |
| DE | 7928703 | 5/1981 | | GB | 424057 | 2/1935 |
| DE | 3041781 | 6/1982 | | GB | 585205 | 1/1947 |
| DE | 3214207 | 11/1982 | | GB | 599793 | 3/1948 |
| DE | 8226153 | 1/1983 | | GB | 636423 | 4/1950 |
| DE | 3343601 | 6/1985 | | GB | 812671 | 4/1959 |
| DE | 86 040049 | 6/1986 | | GB | 812671 | 5/1959 |
| DE | 3512204 | 10/1986 | | GB | 1033866 | 6/1966 |
| DE | 3 246376 | 2/1987 | | GB | 1034117 | 6/1966 |
| DE | 3343601 | 2/1987 | | GB | 1044846 | 10/1966 |
| DE | 4004891 | 9/1990 | | GB | 1237744 | 6/1968 |
| | | | | GB | 1127915 | 9/1968 |

| | | | | | | |
|---|---|---|---|---|---|---|
| GB | 1275511 | 5/1972 | SE | 512290 | 2/2000 | |
| GB | 1348272 | 3/1974 | SE | 512313 | 2/2000 | |
| GB | 1399402 | 7/1975 | SE | 0000200-6 | 8/2001 | |
| GB | 1430423 | 3/1976 | WO | 84/02155 | 6/1984 | |
| GB | 2117813 | 10/1983 | WO | 87/03839 | 7/1987 | |
| GB | 2126106 | 3/1984 | WO | 89/08539 | 9/1989 | |
| GB | 2152063 | 7/1985 | WO | 92/17657 | 10/1992 | |
| GB | 2238660 | 6/1991 | WO | 93/13280 | 7/1993 | |
| GB | 2243381 | 10/1991 | WO | 9313280 | 7/1993 | |
| GB | 2256023 | 11/1992 | WO | 93/19910 | 10/1993 | |
| JP | 54-65528 | 5/1979 | WO | 94/01628 | 1/1994 | |
| JP | 57-119056 | 7/1982 | WO | 94/26999 | 11/1994 | |
| JP | 59-186336 | 10/1984 | WO | 94 126999 | 11/1994 | |
| JP | 3-169967 | 7/1991 | WO | 95/06176 | 3/1995 | |
| JP | 3169967 | 7/1991 | WO | 96/27719 | 9/1996 | |
| JP | 4-106264 | 4/1992 | WO | 96/27721 | 9/1996 | |
| JP | 5-148984 | 6/1993 | WO | 9627719 | 9/1996 | |
| JP | 6-56310 | 5/1994 | WO | 96/30177 | 10/1996 | |
| JP | 6-146553 | 5/1994 | WO | 97/47834 | 12/1997 | |
| JP | 6-200611 | 7/1994 | WO | 9747834 | 12/1997 | |
| JP | 6-320510 | 11/1994 | WO | 98/24495 | 6/1998 | |
| JP | 7-76923 | 3/1995 | WO | 98/24994 | 6/1998 | |
| JP | 7-180333 | 7/1995 | WO | 98/38401 | 9/1998 | |
| JP | 7-300979 | 11/1995 | WO | 99 140273 | 8/1999 | |
| JP | 7-310426 | 11/1995 | WO | 99/66151 | 12/1999 | |
| JP | 8-109734 | 4/1996 | WO | 9966151 | 12/1999 | |
| JP | 8-270193 | 10/1996 | WO | WO 9966152 | 12/1999 | |
| NE | 7 601773 | 2/1976 | WO | WO 0006854 | 2/2000 | |
| NO | 157871 | 2/1988 | WO | WO0047841 | * 8/2000 | ................ 52/582.1 |
| NO | 305614 | 6/1999 | WO | 0063510 | 10/2000 | |
| RU | 363795 | 12/1972 | WO | WO 0066856 | 11/2000 | |
| SE | 711 4900-9 | 9/1974 | WO | WO 0166876 | 9/2001 | |
| SE | 450411 | 6/1987 | WO | 2005 054599 | 6/2005 | |
| SE | 450141 | 9/1987 | | | | |
| SE | 501014 | 10/1994 | | | | |
| SE | 5010141 | 10/1994 | | | | |
| SE | 501914 | 6/1995 | | | | |
| SE | 202994 | 3/1996 | | | | |
| SE | 502994 | 4/1996 | | | | |
| SE | 506254 | 11/1997 | | | | |
| SE | 509059 | 11/1998 | | | | |
| SE | 509060 | 11/1998 | | | | |

OTHER PUBLICATIONS

U.S. Court of Appeals for the Federal Circuit 02-1222-1291 *Alloc, Inc.* vs. *International Trade Commission*, pp. 1-32, Sep. 10, 2003.

U.S. Court of Appeals for the Federal Circuit Decision in *Alloc, Inc. et al.* vs. *International Trade Commission and Pergs, Inc.* et al. decided Sep. 10, 2003.

* cited by examiner

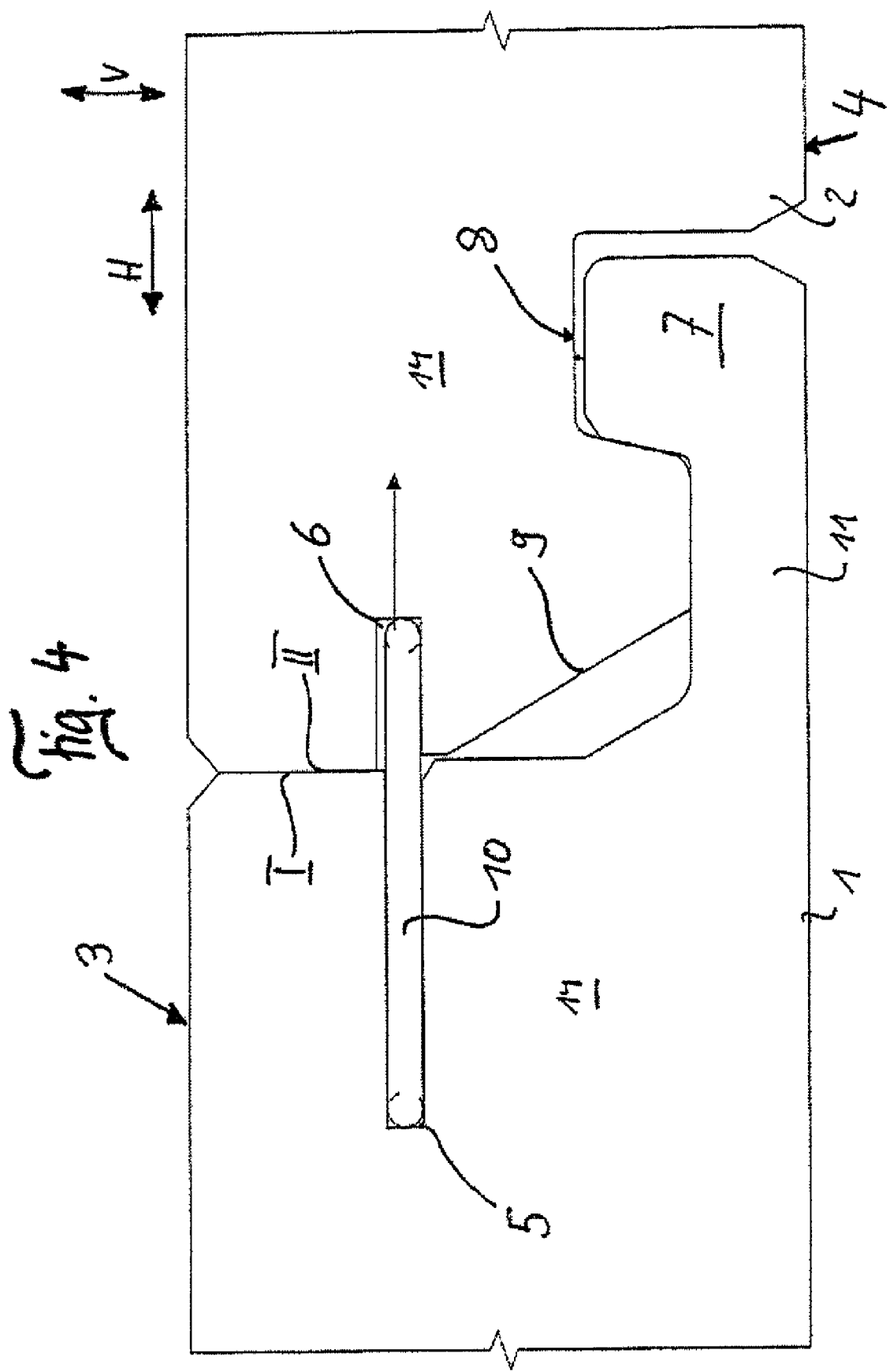

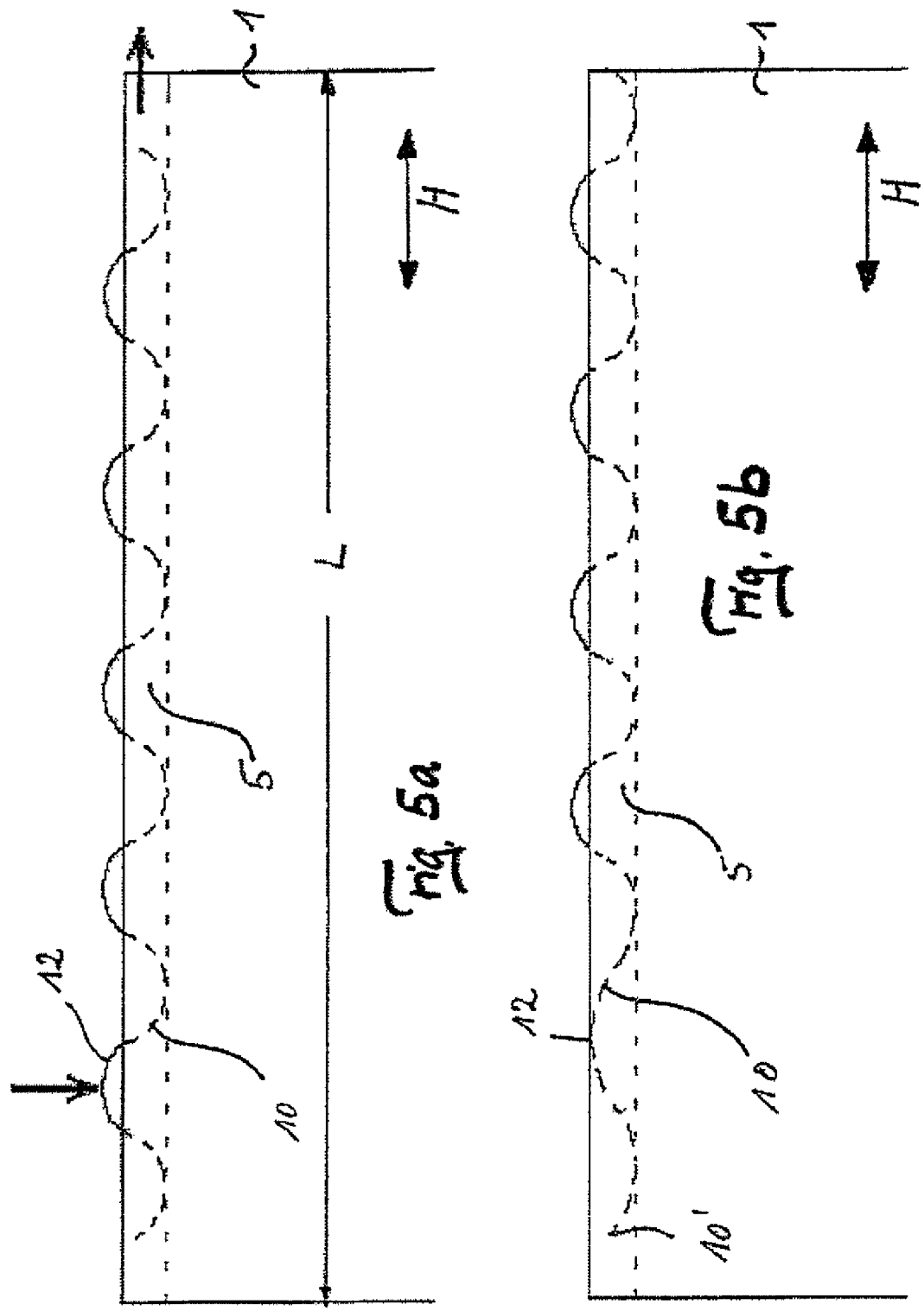

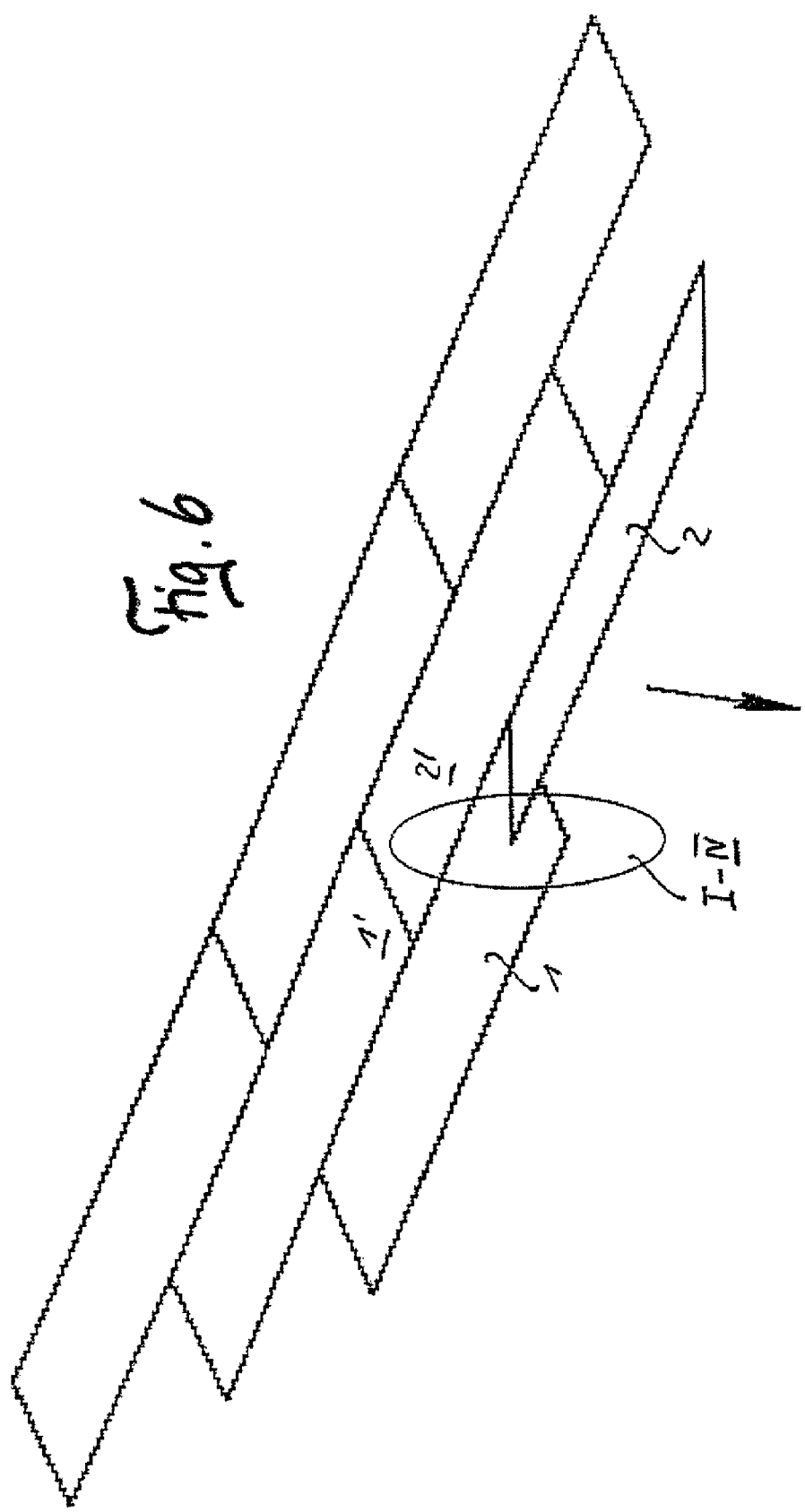

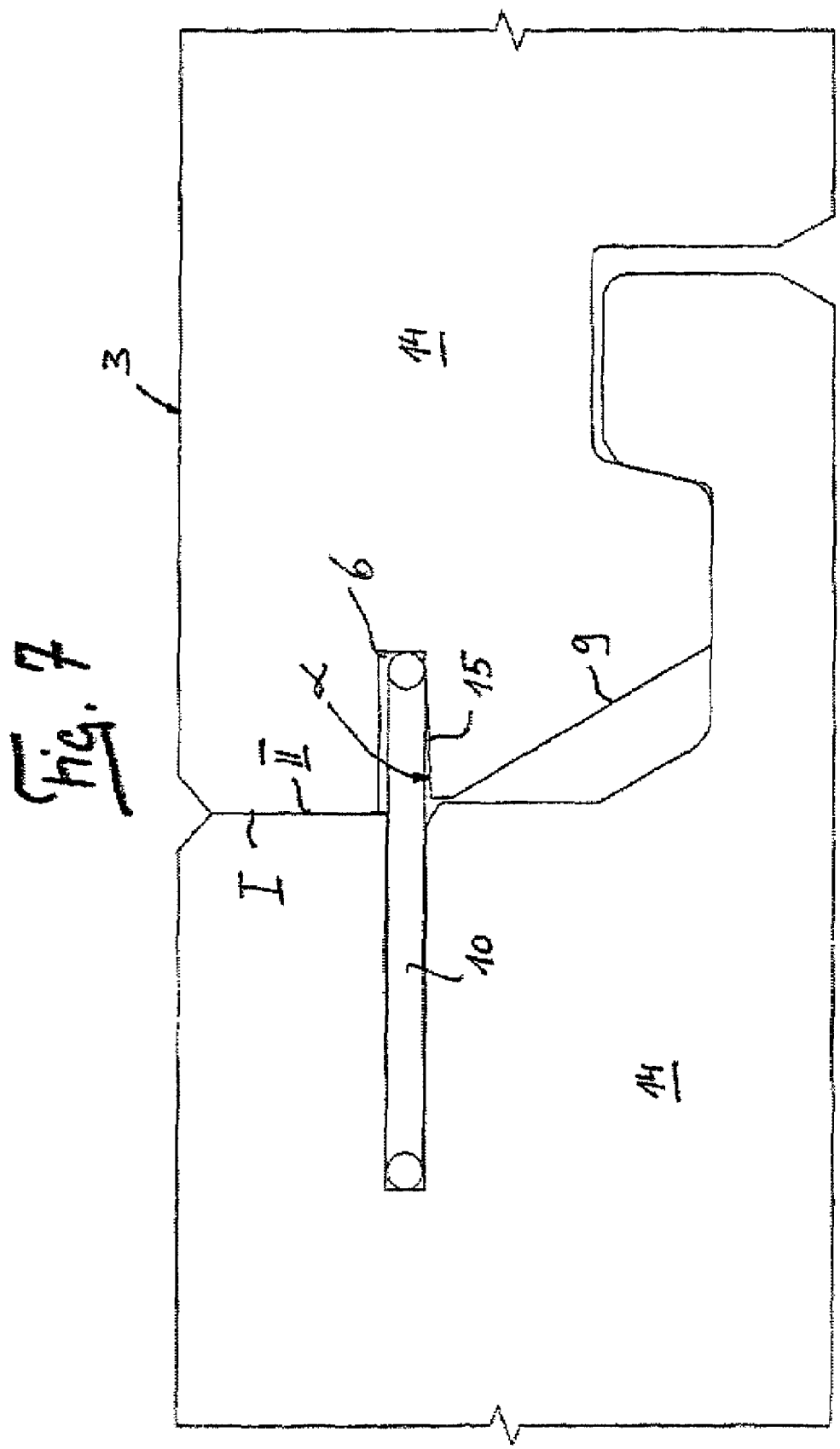

DEVICE AND METHOD FOR LOCKING TWO BUILDING BOARDS

CROSS-REFERENCE TO RELATED APPLICATIONS

The present application claims priority under 35 U.S.C. §119 of German Patent Application No. 10 2006 006 124.1, filed on Feb. 10, 2006, the disclosure of which is expressly incorporated by reference herein in its entirety.

BACKGROUND OF THE INVENTION

1. Field of the Invention

The invention relates to a device and method for locking two building boards connected to one another, in particular floor panels with a core of wood material or wood material/plastic mixture, in a direction perpendicular to a visible side and, more particularly, to a device and method which is designed to lock two building boards to one another by a vertical lowering movement.

2. Discussion of Background Information

WO 2005/054599 shows flooring panels with a locking device. The locking device is provided on the transverse side of floor panels. In addition to the locking device, a hook-shaped profiling is embodied on the transverse side so that two panels can hook into one another with their lateral edges so as to become locked in a direction running parallel to the top side. The panels are provided on the longitudinal side with a self-locking tongue/groove profiling. During laying, the panel to be newly laid against the panel board already laid is first connected on the longitudinal side to the panel already laid by angling the tongue into the groove and then pushing in the angled position in the direction of the lateral edge of the panel previously laid in the same row and then lowered. The hook-shaped profiling engages with one another and the tongue element then snaps into the newly laid panel.

The known tongue element is embodied of plastic and chamfered on its top side. Similar to a door latch, through the chamfer, the tongue element is pressed inwards into the groove by the panel to be newly fitted, when the underside of the tongue element strikes the chamfer and is lowered.

Special injection-molded tools are necessary for the production of the tongue element described above. To this end, the production is relatively expensive. Furthermore, a high-quality plastic must be used in order to provide adequate strength values, which further increases the cost of the tongue element. If plastics are used which have strength values that are too low, this leads to relatively large dimensions of the tongue elements, since this is the only way of ensuring that corresponding forces can be generated or transferred.

Accordingly, there exists a need in the art to overcome the deficiencies and limitations described hereinabove.

SUMMARY OF THE INVENTION

To solve the above problem, the invention provides a tongue element comprising a steel spring bent in a sinusoidal manner and having a plurality of wave arches. More particularly, in embodiments, the invention relates to a device for locking two building boards connected to one another, in particular floor panels with a core of wood material or wood material/plastic mixture, in a direction perpendicular to a visible side. The tongue element is inserted into a groove provided in the core of a first building board and running parallel to the visible side. The tongue is automatically snapped into the groove provided in the core of a second building board running parallel to the visible side by a vertical lowering movement, when both grooves overlap during the connection of the building boards. A lower lip having an outer projection projects upwards is provided on a lateral edge I and projects laterally over such edge. On the opposite lateral edge II is a recess facing an underside. The recess is embodied in a manner corresponding to the projection.

The production of the tongue element is considerably simpler and thus more cost-effective. Commercial spring wire can be used for the tongue element, which is cut from a roll into corresponding length and then bent into a desired shape. Using the wire, the transferable forces are much higher with respect to a known tongue element with the same dimensions. The thickness of the tongue element can thus be reduced, so that thin building boards, in particular floor panels, can also be provided with the locking device without the building board being weakened too much on the lateral edges through the milling of the grooves in the core. This reduces the risk of damage during transport.

The tongue element preferably has essentially the same length as the groove. The locking points of two building boards are thus optimized based on the strength. The tongue element lies alternately with the wave trough of the bent shape against the base of the groove of the first building board and snaps into the groove of the other building board with the wave peak.

The spring element is preferably placed into the groove by the factory. In order to prevent it falling out of the groove, the tongue element is blocked in preferably at one end of the groove. The blocking can be carried out by gluing or by angling the end of the wire and driving the end into the groove base or inserting it in a bore provided in the groove base.

If the wall of the opposite lateral edge runs under the groove sloping inwards, the spring wire is forced in a simple manner by the panel being lowered into the groove in which it is attached. In this manner, the spring wire is biased. Also, the wave arch which the panel strikes becomes flatter in shape, which causes an increase in length of the arch, and the tongue element is pushed in the direction of the groove.

The wall under the groove into which the tongue element is to snap at first springs back parallel to the wall in a first area and then runs sloping inwards. This renders possible an optimal displacement of the tongue element upon angling.

Snapping in the tongue element is facilitated if the lower wall of the groove (e.g., lower lip) runs tilted towards the groove opening. The tilt angle is about 2° to 5°, and preferably about 3°.

In aspect of the invention, a device is provided for locking two building boards connected to one another in a direction perpendicular to a visible side. The device includes a tongue element inserted into a groove provided in a core of a first building board. The tongue element runs parallel to the visible side and comprises a spring having a plurality of wave arches. A groove is provided in a core of a second building board and runs parallel to the visible side. The groove of the first and second building boards are configured such that when the groove of the first and second building boards overlap during a connection of the first and second building boards, by a vertical lowering movement, the first and second building boards are locked in a direction parallel to the visible side. A lower lip has an outer projection which projects upwards on a lateral edge of the first building board and projects laterally over the lateral edge. A recess is formed on an opposite lateral edge facing towards an underside of the second building board. The recess is embodied to correspond to the outer projection.

In embodiments, the tongue element has essentially a same length as the groove of the first building board. The spring is blocked in the groove of the first building board on one end. The spring is blocked by gluing. The spring is blocked by an angling an end of the spring into a base of the groove of the first building board. The spring is blocked by inserting it into a bore provided in a base of the groove of the first building board. A wall slopes inwards under the groove of the second building board. A transition wall in a first area is provided under the groove of the second building board. The transition wall in the first area is configured to spring back parallel to a wall above the groove of the second building board. A lower wall of the groove of the second building board runs tilted at an angle α towards a visible side. The angle α lies in a range of about 2° to 5°. The angle α is about 3°. The spring is steel. The first and second building boards are floor panels with the core comprising wood material or wood material/plastic mixture. The spring is bent in a sinusoidal manner. The tongue element is configured to automatically snap into the groove provided in the core of the second building board by the vertical lowering movement.

In another aspect of the invention, the device for locking two building boards comprises a tongue element inserted into a groove of a first building board. The tongue element comprises a spring having a plurality of wave arches. A groove is provided in a core of a second building board and corresponds to the groove of the first building board, such that when the groove of the first and second building boards overlap during a connection of the first and second building boards, by a vertical lowering movement, the first and second building boards are locked in a direction parallel to the visible side by the tongue element.

The spring is bent in a sinusoidal manner. The groove of the first building board has a depth greater than the groove of the second building board. The wave arches are configured to become flatter in shape causing an increase in length of each arch when the first and second building boards are locked together. The tongue element is blocked at one end of the groove of the first building board. The tongue element is blocked by one of gluing, angling of an end and driving into a base of the groove of the first building board and inserting in a bore provided in the base. The tongue element lies alternately with a wave trough against a base of the groove of the first building board and snaps into the groove of the second building board with a wave peak. A lower wall of the groove of the second building board slopes at an angle α of about 3° towards a visible side.

A method of connecting panels at least at a transverse side thereof is also contemplated by the invention. The method includes connecting a first panel in a subsequent row to two panels already laid and lowered in a previous row, on its longitudinal side, by inserting a tongue or groove profile with a groove or tongue profile, respectively, of the two panels already laid and lowered. The first panel of the subsequent row has a bent tongue element in its groove. The method further includes connecting a second panel in the subsequent row on its longitudinal side by inserting its tongue or groove profile into the groove or tongue profile, respectively, of a second of the two panels in the previous row, while the second panel in the subsequent row remains at an angle with respect to the two panels. The second panel of the subsequent row is pushed in a longitudinal direction of the first panel until its transverse side is into contact with a lateral edge of the first panel of the subsequent row, which is already laid. The second panel in the subsequent row is angled vertically downward whereby an underside of the second panel in the subsequent row comes into contact with the tongue element and, upon further lowering of the second panel in the subsequent row. The tongue element is pushed into a groove of the panel in the subsequent row. The second panel in the subsequent row is further lowered such that tongue element strikes against an area running vertically in the second panel of the subsequent row such that a wave arch of the tongue element is completely inserted into the groove of the second panel which extends the tongue element in the longitudinal direction.

In further aspects, tongue element is attached with its end in the groove of the first panel in the subsequent row and the tongue element extends only in one direction. The tongue element extends in a direction in which the first and second panels of the subsequent row are not yet fully connected to one another. The further lowering of the second panel of the subsequent row causes an underside or walls to come into contact with a next arch of the tongue element, whereby a first arch at first remains flattened, since a springing out is prevented due to a tilted position of the second panel of the subsequent row. Next arches are pushed into the groove of the first panel of the subsequent row when the second panel of the subsequent row is moved downwards. Upon completion of the angling, the groove of the second panel in the subsequent row pivots into a plane of the tongue element or completely overlaps the groove of the first panel of the subsequent row such that arches of the tongue element are no longer blocked by a wall and springs out into the groove of the second panel of the subsequent row. The spring out results in a shortening of the tongue element, which then adopts its original shape. A top side of the second panel of the subsequent row has an angle of approximately 20° with respect to top sides of the two panels in the previous row, prior to the angling. The projection of the first panel in the subsequent row is inserted into a recess on an underside of the second panel in the subsequent row.

BRIEF DESCRIPTION OF THE DRAWINGS

The present invention is further described in the detailed description which follows, in reference to the noted plurality of drawings by way of nonlimiting examples of exemplary embodiments of the present invention, in which like reference numerals represent similar parts throughout the several views of the drawings, and wherein:

FIG. 4 shows a partial side view of two building boards connected to one another and locked in two directions, in accordance with the invention;

FIG. 5a shows a plan view of a building board in accordance with the invention;

FIG. 5b shows a plan view of a building board in accordance with the invention;

FIG. 6 shows a perspective view of a partially laid board, in accordance with the invention; and FIG. 7 shows an alternative embodiment in accordance with the invention.

DETAILED DESCRIPTION OF THE PRESENT INVENTION

Figure 1:
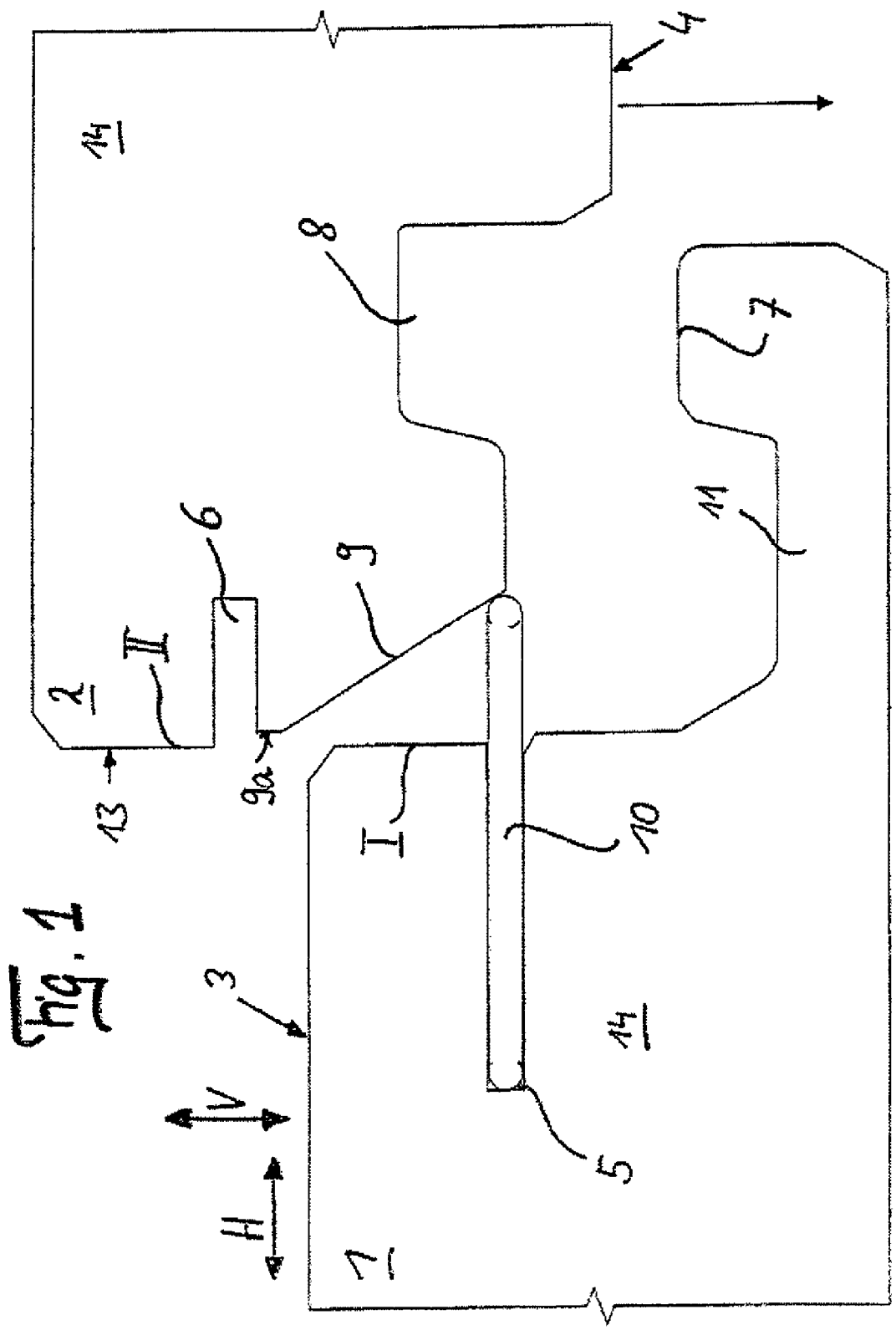
FIG. 1 shows a partial side view of two building boards to be connected in a first position, in accordance with the invention.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how these Referring to FIGS. 1-4, the building board is preferably a flooring panel with a core 14 of wood material (MDF or HDF) or a wood material/plastic mixture. At a visible side 3, a decorative layer with, e.g., a wood grain, can be adhered to the core 14 or pressed with the core 14. In alternative embodiments, a pattern can be printed directly onto the visible side 3. On the lateral edges I, II, lying opposite one another, grooves 5, 6 run parallel to the visible side 3. The grooves 5, 6 are milled into the core 14 in a same horizontal plane. The grooves 5, 6 can be of equal depth or, as shown in FIGS. 1-4, of differing depths.

A tongue element 10 of spring steel is inserted into the deeper groove 5 and attached by one end in the groove 5. The spring 10 extends essentially over the full length L of the groove 5 and is bent in a sinusoidal manner. The lateral edges I, II are profiled in a hook-shaped manner so that two panels 1, 2 connected to one another are locked in the horizontal direction H. A lower lip 11 projecting laterally over the lateral edge I is provided on the underside 4 on one lateral edge I. The lip 11 has an outer projection 7 projecting upwards.

A recess 8 corresponding to the projection 7 is arranged on the opposite lateral edge II. The recess 8 is graduated so that the panel 2 bears on the lower lip 11 of the panel 1 and the panels 1, 2 are supported in the vertical direction V.

A wall 9 runs under the groove 6, which is sloping inwards towards the underside 4. In embodiments, a short area (e.g., transition wall) 9a on the wall 9 begins under the groove 6 at first perpendicular to the visible side 3 but set back slightly with respect to wall 13 above the groove 6 before the lateral edge II merges into the wall 9 running in a sloping manner. Thus, the transition area 9a is provided between the groove 6 and the wall 9. In embodiments, the transition area 9a runs vertically with respect to the surface 3, as does the wall 13.

As shown more specifically in FIGS. 5a and 5b, the spring 10 has a plurality of wave arches 12. The spring 10 extends essentially over the full length L of the groove 5 and is bent in a sinusoidal manner. The lateral edges I, II are profiled in a hook-shaped manner so that two panels 1, 2 connected to one another are locked in the horizontal direction H.

As FIG. 7 shows, the lower wall 15 of the groove 6 runs towards the visible side II sloping at an angle α that is preferably about 3°. FIG. 7 also shows the panels 1, 2 connected together, with the tongue element (e.g., spring) 10 inserted into the grooves 5, 6. As further shown, the projection 7 is inserted into the recess 8.

FIG. 6 further shows, in conjunction with FIGS. 1 through 5b, a connection method of the two panels 1, 2, at the transverse side. More specifically, a panel 1, which accommodates the bent tongue element 10 in its groove 5, is connected by the longitudinal side with the aid of a tongue/groove profile present on its longitudinal sides with two panels 1', 2' already laid and lowered to the ground. Then another panel 2, which has the same longitudinal profile, is inserted therewith into the longitudinal profile of the panel 2' already laid but not yet lowered. The top side of the panel 2 has an angle of approximately 20° to the top sides of the two panels 1', 2' already laid. Then the panel 2 is pushed in the longitudinal direction H of the first already lowered panel 1 until its transverse side at the transition to the top side comes into contact with the lateral edge I of the panel 1, already laid.

Figure 2:
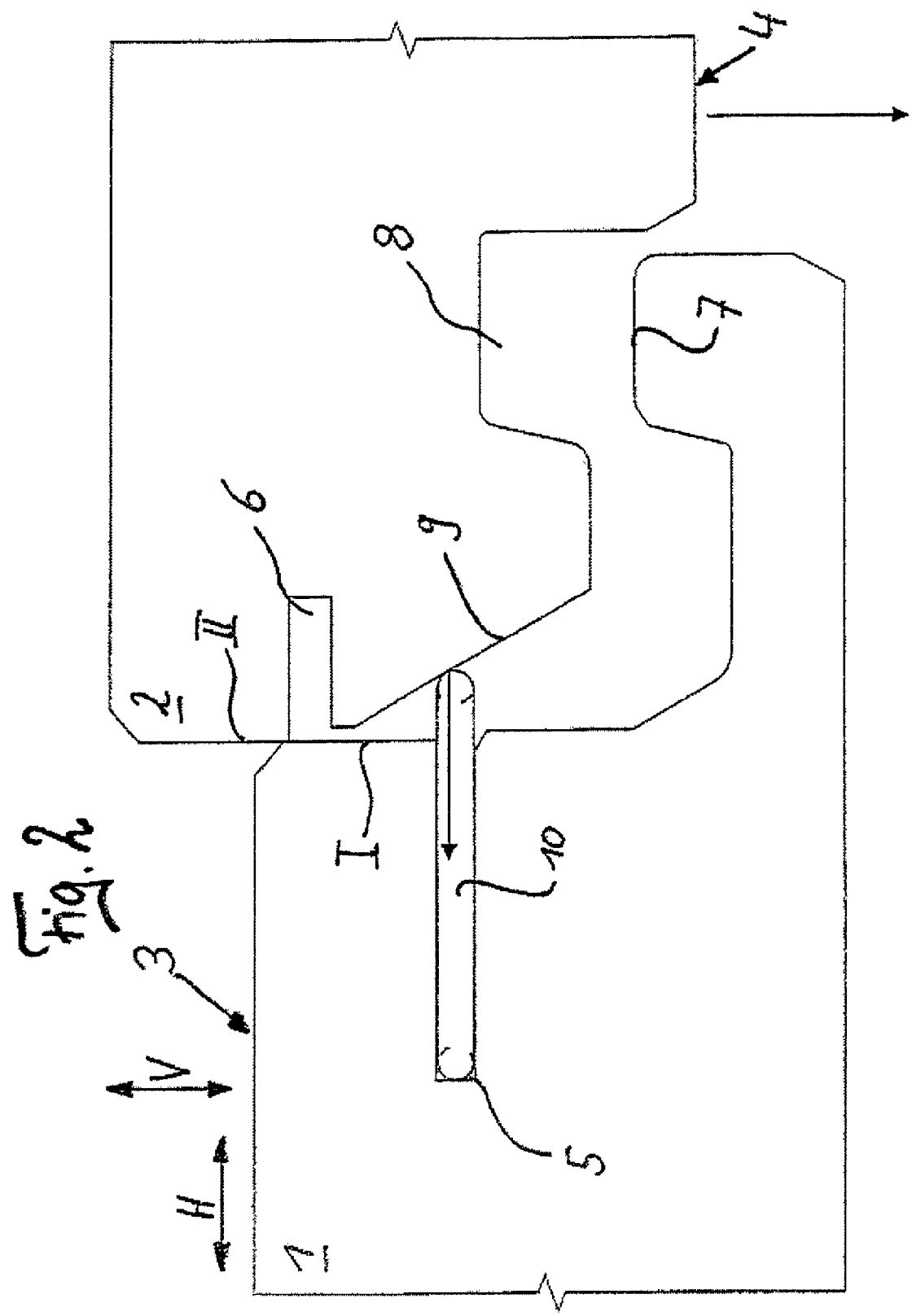
FIG. 2 shows a partial side view of two building boards to be connected in a second position, in accordance with the invention.
Figure 3:
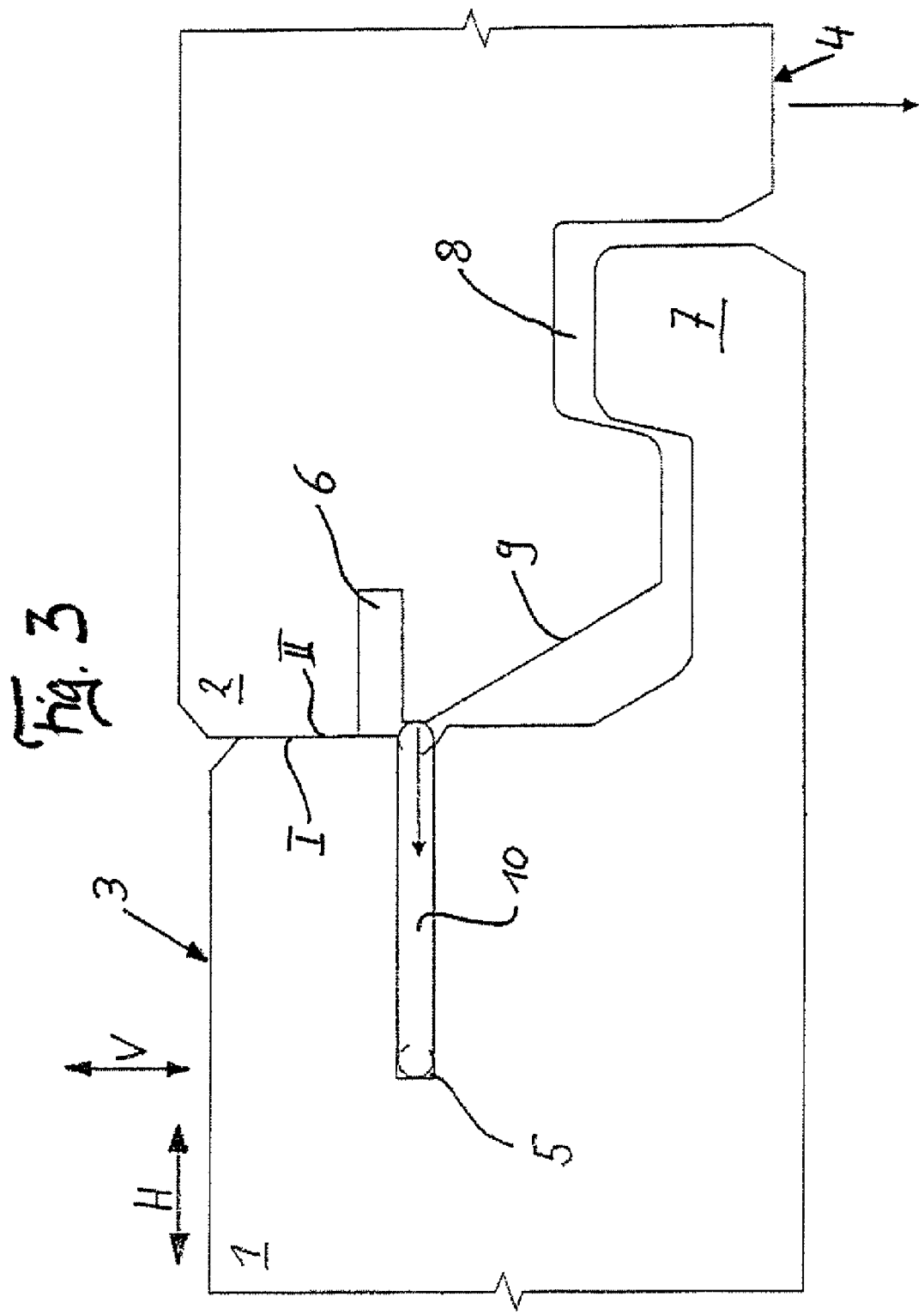
FIG. 3 shows a partial side view of two building boards to be connected in a third position, in accordance with the invention.

The panel 2 is then angled, whereby the underside 4 comes into contact with the tongue element 1 (FIG. 1) and, upon further lowering of the panel 2, through the sloping wall 9 of the lateral edge II the tongue element 10 is pushed into the groove 5 (FIG. 2). With further lowering, the tongue element 10 then strikes against the area 9a running vertically (FIG. 3). As FIG. 5b shows, the wave arch 12 of the tongue element 10 is then completely inserted into the groove 5, which extends the tongue element 10 in the longitudinal direction H.

Since the tongue element 10 is attached with its end 10' in the groove 5, the extension of the tongue element 10 can occur only in one direction, namely in the direction in which the panels 1, 2 are not yet fully connected to one another. With the further lowering of the panel 2, the underside 4 or the walls 9, 9a come into contact with the next arch 12 of the spring element 10, whereby the first arch 12 at first remains flattened, since a springing out is prevented due to the tilted position of the panel 2 and thus also of the groove 6.

The next arch 12 is pushed into the groove 5 through the panel 2 moved downwards analogously to the first arch 12 of the tongue element 10. This arch 12 is also flattened which leads, on the one hand, to the generation of a spring force and, on the other hand, to a further increase in length of the arch 12.

Upon further downward pivoting of the panel 2, the other arches 12 of the spring element 10 are pressed into the groove 5 of the panel 1 analogously to the first two arches 12. Upon completion of the angling operation, the groove 6 of the third panel pivots into the plane of the tongue element 10 or completely overlaps the groove 5 so that the biased wire arches 12 of the tongue element 10 are no longer blocked by the wall 9a and spring out into the groove 6 of the panel 2. This springing out is associated with a shortening of the tongue element 10, which then adopts its original shape again (FIG. 5a).

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A device for locking two building boards connected to one another in a direction perpendicular to a visible side, comprising:

a tongue element inserted into a groove provided in a core of a first building board made of wood material or wood material/plastic mixture, the tongue element running parallel to the visible side and comprising a spring made of steel and having a plurality of wave arches and being bent in a sinusoidal manner;

a groove provided in a core of a second building board made of wood material or wood material/plastic mixture and running parallel to the visible side, wherein the groove of the first and second building boards are configured such that when the groove of the first and second building boards overlap during a connection of the first and second building boards, by a vertical lowering movement, the first and second building boards are locked in a direction parallel to the visible side;

a lower lip having an outer projection projects upwards on a lateral edge of the first building board and projects laterally over the lateral edge; and a recess on an opposite lateral edge facing towards an underside of the second building board, the recess being embodied to correspond to the outer projection.

2. The device according to claim 1, wherein the tongue element has essentially a same length as the groove of the first building board.

3. The device according to claim 1, wherein the spring is blocked in the groove of the first building board on one end.

4. The device according to claim 3, wherein the spring is blocked by gluing.

5. The device according to claim 3, wherein the spring is blocked by angling an end of the spring into a base of the groove of the first building board.

6. The device according to claim 3, wherein the spring is blocked by inserting it into a bore provided in a base of the groove of the first building board.

7. The device according to claim 1, further comprising a wall sloping inwards under the groove of the second building board.

8. The device according to claim 7, further comprising a transition wall in a first area under the groove of the second building board, the transition wall in the first area has a feature of springing back parallel to a wall above the groove of the second building board.

9. The device according to claim 1, further comprising a lower wall of the groove of the second building board which runs tilted at an angle a towards a visible side.

10. The device according to claim 9, wherein the angle a lies in a range of about 2° to 5°.

11. The device according to claim 9, wherein the angle α is about 3°.

12. The device according to claim 1, wherein the tongue element is configured to automatically snap into the groove provided in the core of the second building board by the vertical lowering movement.

13. The device according to claim 1, wherein the tongue element is bent in the sinusoidal manner along its length.

14. The device according to claim 1, wherein the tongue element is bent in the sinusoidal manner such that the tongue elements includes peaks and troughs along its length.

15. A device for locking two building boards connected to one another in a direction (V) perpendicular to a visible side, the building boards having a core of wood material or wood material/plastic mixture, comprising:

a tongue element inserted into a groove of a first building board provided in the core and running parallel to the visible side, the tongue element comprising a steel spring having a plurality of wave arches and bent in a sinusoidal manner;

a groove provided in the core of a second building board and corresponding to the groove of the first building board, such that when the groove of the first and second building boards overlap during a connection of the first and second building boards, by a vertical lowering movement of the second building board, the first and second building boards are locked in a direction parallel to the visible side by the tongue element comprising the steel spring having a plurality of wave arches and bent in the sinusoidal manner; and a lower lip with an outer projection projecting upwards is provided on a lateral edge and projecting laterally over the edge, and on an opposite lateral edge a recess facing an underside, wherein the recess is embodied in a manner corresponding to the projection.

16. The device according to claim 15, wherein the groove of the first building board has a depth greater than the groove of the second building board.

17. The device according to claim 15, wherein the wave arches are configured to become flatter in shape causing an increase in length of each arch when the first and second building boards are locked together.

18. The device according to claim 15, wherein the tongue element is blocked at one end of the groove of the first building board.

19. The device according to claim 18, wherein the tongue element is blocked by one of gluing, angling of an end and driving into a base of the groove of the first building board and inserting in a bore provided in the base.

20. The device according to claim 15, wherein the tongue element lies alternately with a wave trough against a base of the groove of the first building board and snaps into the groove of the second building board with a wave peak.

21. The device according to claim 15, wherein a lower wall of the groove of the second building board slopes at an angle α of about 3° towards a visible side.

22. The device according to claim 15, wherein the steel spring is bent in the sinusoidal manner such that the steel spring includes peaks and troughs along its length.

23. A method of connecting panels at least at a transverse side thereof, comprising:

connecting a first panel in a subsequent row to two panels already laid and lowered in a previous row, on its longitudinal side, by inserting a tongue or groove profile with a groove or tongue profile, respectively, of the two panels already laid and lowered, the first panel of the subsequent row has a bent tongue element in its groove;

connecting a second panel in the subsequent row on its longitudinal side by inserting its tongue or groove profile into the groove or tongue profile, respectively, of a second of the two panels in the previous row, while the second panel in the subsequent row remains at an angle with respect to the two panels;

pushing the second panel of the subsequent row in a longitudinal direction of the first panel until its transverse side is into contact with a lateral edge of the first panel of the subsequent row, which is already laid;

angling the second panel in the subsequent row vertically downward whereby an underside of the second panel in the subsequent row comes into contact with the tongue element and, upon further lowering of the second panel in the subsequent row, the tongue element is pushed into a groove of the panel in the subsequent row; and further lowering the second panel in the subsequent row such that tongue element strikes against an area running vertically in the second panel of the subsequent row such that a wave arch of the tongue element is completely inserted into the groove of the second panel which extends the tongue element in the longitudinal direction, wherein the further lowering of the second panel of the subsequent row causes an underside or walls to come into contact with a next arch of the tongue element, whereby a first arch at first remains flattened, since a springing out is prevented due to a tilted position of the second panel of the subsequent row, and upon further downward pivoting of the second panel the arches of the tongue element are pressed into the groove of the first panel similar to the other arches.

24. The method according to claim 23, wherein the tongue element is attached with its end in the groove of the first panel in the subsequent row and the tongue element extends only in one direction.

25. The method according to claim 24, wherein the tongue element extends in a direction in which the first and second panels of the subsequent row are not yet fully connected to one another.

26. The method according to claim 23, wherein next arches are pushed into the groove of the first panel of the subsequent row when the second panel of the subsequent row is moved downwards.

27. The method according to claim 23, wherein, upon completion of the angling, the groove of the second panel in the subsequent row pivots into a plane of the tongue element or completely overlaps the groove of the first panel of the subsequent row such that arches of the tongue element are no longer blocked by a wall and springs out into the groove of the second panel of the subsequent row.

28. The method according to claim 27, wherein the spring out results in a shortening of the tongue element, which then adopts its original shape.

29. The method according to claim 23, wherein a top side of the second panel of the subsequent row has an angle of approximately 20° with respect to top sides of the two panels in the previous row, prior to the angling.

30. The method according to claim 23, wherein a projection of the first panel in the subsequent row is inserted into a recess on an underside of the second panel in the subsequent row.

31. The method according to claim 28, wherein the spring out results in a shortening of the tongue element in its lengthwise direction.

* * * * *